April 7, 1953
J. D. LEITCH ET AL
2,634,389
OVERSPEED PROTECTION MEANS FOR DIRECT
CURRENT MOTOR OPERATED HOISTS
Filed June 13, 1950
2 SHEETS—SHEET 2
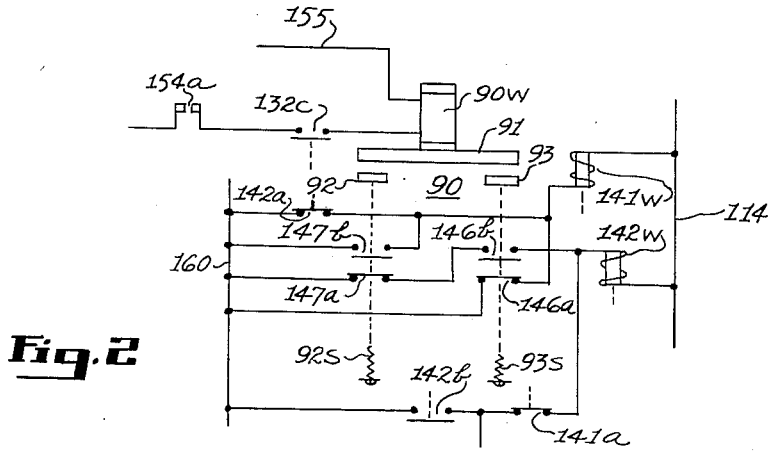
*Fig. 2*
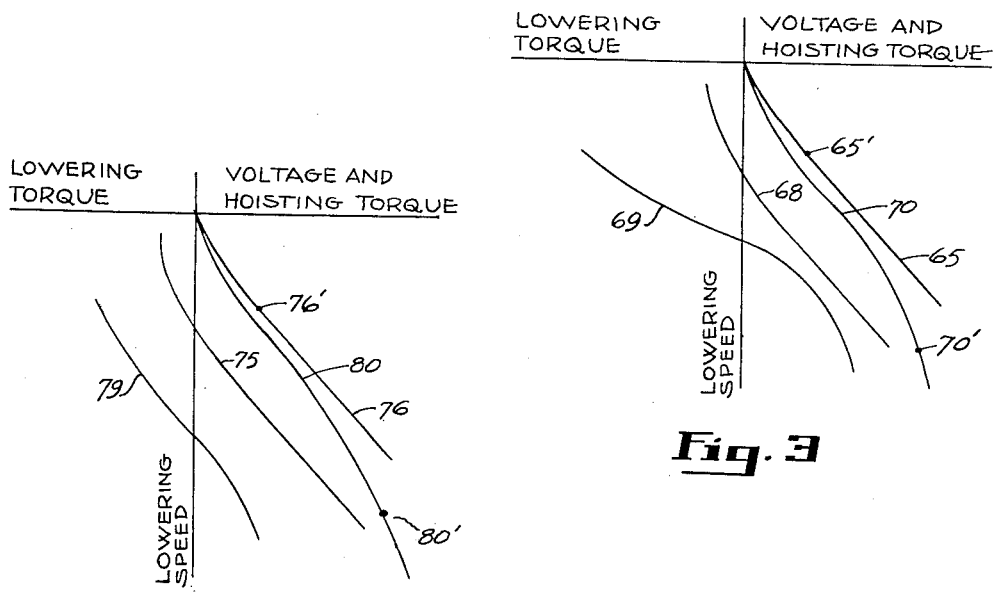
*Fig. 3*
*Fig. 4*
INVENTORS.
John D. Leitch &
BY Ward L. Smith
John H. Leonard &
Harold J. Rathbun,
their Attorneys Patented Apr. 7, 1953

2,634,389

UNITED STATES PATENT OFFICE 2,634,389

OVERSPEED PROTECTION MEANS FOR DIRECT CURRENT MOTOR OPERATED HOISTS

John D. Leitch, Shaker Heights, and Ward L. Smith, Hudson, Ohio, assignors to The Electric Controller & Manufacturing Company, Cleveland, Ohio, a corporation of Ohio Application June 13, 1950, Serial No. 167,712

12 Claims. (Cl. 318—249)

This invention relates to motor control systems for direct current motors and more particularly to a control system for a series-type direct current motor driving the hoist motion of a crane or the like and wherein the armature winding and field winding of the motor are connected in parallel with each other for lowering operations.

In the operation of a hoist by a direct current motor, it is common practice to control the lowering operations by connecting the motor in a dynamic lowering circuit which permits the motor either to drive the load as a shunt motor or to retard the load as a generator, the weight of the load determining the action of the motor. Suitable resistors in series with the motor, that is, in the line circuit between the motor and the source, and also in the paralleled field and armature circuits are adjusted to control the speed during lowering operations. The fastest lowering speed usually is obtained by so adjusting the resistors that the resistance of both the line circuit and the armature circuit is relatively small, whereas the resistance of the field circuit is relatively large. The current in the field winding under these conditions remains at a relatively low value regardless of the size and ultimate speed of an overhauling load. The resultant small value of flux requires that the armature current become relatively large in order for the motor to exert sufficient retarding torque to limit the speed of heavy loads. If the load is heavy enough, the large armature current saturates the commutating poles of the motor and the motor operates as an undercompensated generator. Because of the small value of flux produced by the field winding, the resulting demagnetizing action of the current in the turns of the armature winding short-circuited by the brushes together with the effect of the cross-magnetizing armature reaction results in a material reduction in the effective motor flux. Consequently, large overhauling loads can cause speeds to be reached at which the retarding torque of the motor no longer increases proportionately with the speed. At somewhat higher speeds, the retarding torque no longer increases and the motor becomes unstable. The load thereafter can accelerate substantially without restraint unless the motor connections are changed to effect an increase in the field current.

Most dynamic lowering hoist controllers are so designed that, when the master switch is in the last of several lowering speed points, the resistors in the several motor circuits are adjusted to permit the fastest lowering speed for light loads consistent with utmost safety if the last speed point also should be used to lower any load which the hoist is capable of lifting. However, due to changes in friction, gearing, or the like, even controllers so designed have permitted excessive lowering speeds to be reached. In some instances, particularly in the case of cranes that only occasionally may be called upon to lower a load near the limit of their capacity, it is often desirable to provide a fast lowering speed connection for light loads which, if used for lowering a heavy load, would permit an excessive speed.

Accordingly, dynamic lowering hoist controllers have been provided with relay means responsive to armature current or voltage which automatically change the motor connections from the fastest to a slower speed connection when the lowering speed reaches a predetermined high value. Many of these relay means have involved complicated circuits and expensive equipment. In all known prior simplified systems of this type, however, there is a possibility that the overspeed relay means might have become defective in some manner and cannot operate when needed. No provision was made in the prior systems to apprise the operator in advance that such relay had failed. As a result what was intended as a safety feature becomes, in fact, a hazard in itself as it lulls the operator into a false security. In many cases, the overspeed relay means is used in order to permit the choice of a larger field circuit resistance than would be possible without the relay means. This results in a much smaller motor flux and failure of the relay means is of increased seriousness since the load can easily drive the motor beyond the much reduced stability limit. Even if the field strength is not reduced from its usual low value for the last speed point connections, the use of an overspeed relay means which can fail to operate with no previous indication that it has become inoperative defeats the very purpose for which it was provided.

It has also been common practice to permit the establishment of the fastest lowering connections only when the motor speed reaches a predetermined value thereby to prevent an excessive acceleration current peak. In a well known controller of this type, the operation of the contactors for setting up the last point lowering connections is prevented until operation of an acceleration relay responsive to the voltage across the motor armature winding.

The present invention is an improved controller of this type, and in accordance with a preferred embodiment thereof, includes an overspeed relay means which comprises an acceleration relay and an overspeed relay. The operating winding of the acceleration relay, which controls the initial establishment of the fastest lowering speed connections, is connected across the armature winding in series with the operating winding of the overspeed relay. The acceleration relay operates at a relatively low speed to permit establishment of the high speed connections and the overspeed relay responds at a relatively much higher speed to effect reestablishment of slow speed connections. Since the operating windings of the two relays are in series, a failure of the operating winding of the overspeed relay or its energizing circuit prevents the acceleration relay from operating to permit the establishment of the only connections which would require operation of the overspeed relay. Each of the two relays of the speed control device has normally open and normally closed contacts. These contacts are so interlocked with each other and with the operating windings and auxiliary contacts of a pair of contactors in the dynamic lowering circuit that, during automatic acceleration, the slower speed contactor always opens after the higher speed contactor closes and, during automatic or manual deceleration, the slower speed contactor always closes before the higher speed contactor opens. In a modification the functions of the acceleration and overspeed relays are performed by a single coil relay having a pair of independent armatures.

Only a minimum of additional equipment of simplified and standard design is required by this invention to provide, for a dynamic lowering hoist controller, overspeed protection that fails safe. Although complete interlocking functions are provided, the complexity of the usual controller is not increased materially. These advantages result from a novel use of the same control circuits that control the establishment of the high speed lowering connections to control also the reestablishment of low speed connections in event an excessive speed is approached.

The principal object is to provide a simplified overspeed responsive means for a dynamic lowering hoist controller which fails safe.

A further object of this invention is to provide a dynamic lowering hoist control system in which an automatic means for effecting the fastest lowering speed connections is prevented from operating unless a protective overspeed responsive means is in operative condition.

Another object is to provide a dynamic lowering hoist control system having improved means for permitting the establishment of high speed lowering connections and for assuring reversion to low speed lowering connections if a predetermined high speed is reached.

Another object is to provide a dynamic lowering hoist control system which retains all of the advantages of the usual dynamic lowering hoist control systems provided with armature voltage responsive acceleration control means for the fastest lowering speed point and which includes, in addition thereto, improved means for assuring automatic reversion to slower speed connections if the last point speed becomes excessive.

Other objects and advantages will become apparent from the following specification wherein reference is made to the drawings, in which:

Fig. 2 is a fragmentary wiring diagram illustrating a modification; and

Figs. 3 and 4 are graphs illustrating operating features of the system.

Figure 1:
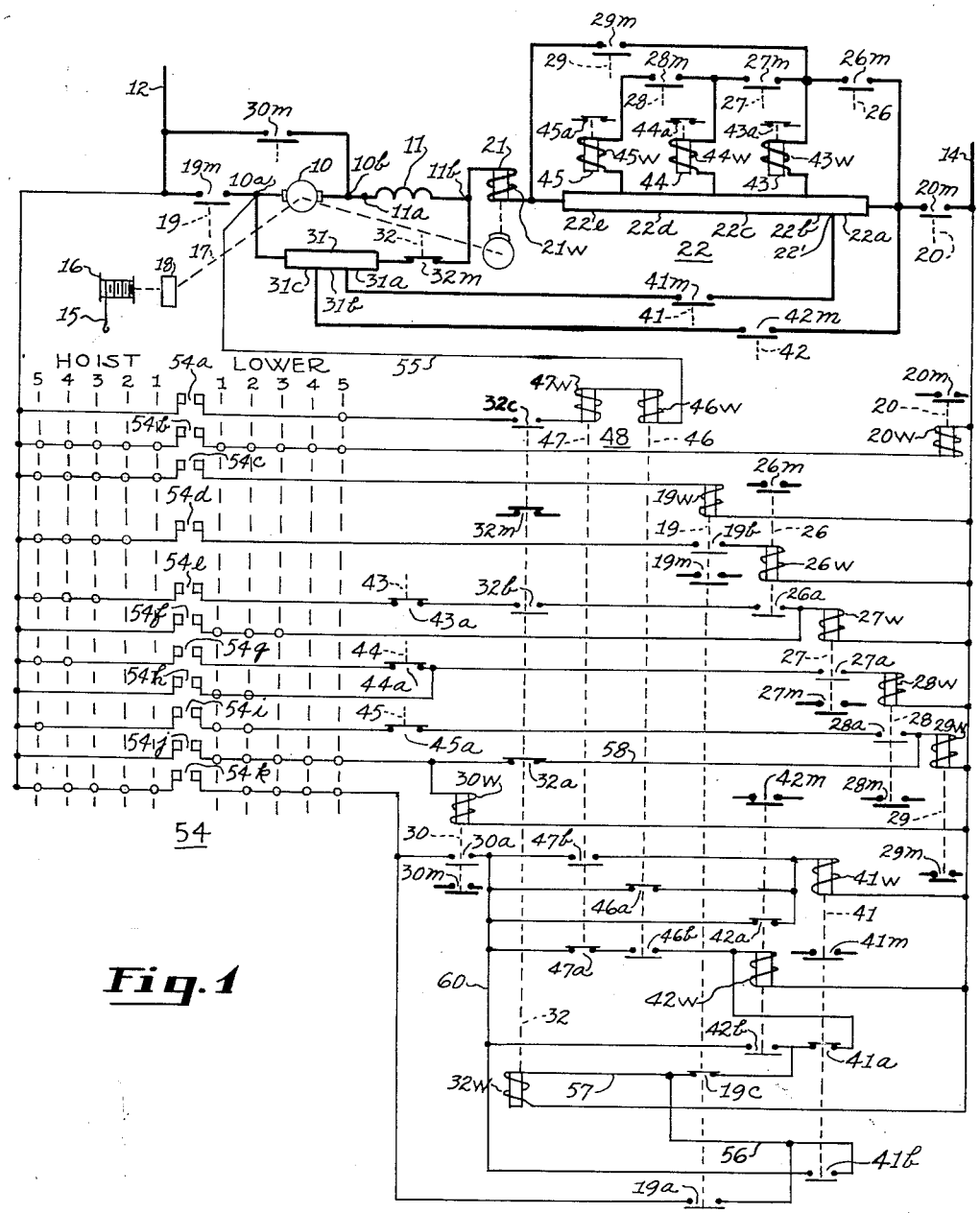
Fig. 1 is a wiring diagram of a dynamic lowering hoist control system in accordance with this invention.

Referring to Fig. 1, a direct current motor comprising an armature winding 10 having brush terminals 10a and 10b and a series-type field winding 11 having terminals 11a and 11b is arranged to be energized from direct current power supply conductors 12 and 14 for raising and lowering of a load holding device such as hook 15 suspended from a cable drum 16 driven by the motor armature through a shaft 17 and suitable gearing 18. For operation of the motor in the hoisting direction, electromagnetic switches 19 and 20 are arranged to connect, through their respective main contacts 19m and 20m, the armature winding 10, the field winding 11, an operating winding 21w of a spring-applied, electromagnetically released brake 21, and an acceleration and speed controlling resistor 22 in series with each other across the supply conductors 12 and 14. The brake 21 is operable as by gravity or a spring (not shown) to hold the armature winding 10 and the drum 16 against rotation whenever the winding 21w is deenergized and to permit rotation of the armature and drum whenever the winding 21w is energized. Increased hoisting speeds are obtained by seriately closing main contacts 26m, 27m, 28m, and 29m of electromagnetic acceleration switches 26, 27, 28, and 29, respectively, to short circuit sequentially sections 22a and 22b, 22c, 22d, and 22e of the resistor 22 from the motor circuit.

During lowering operations of the hoist, the armature winding 10 and the field winding 11 are connected so that the motor becomes in effect a shunt machine. For operations of the motor in the lowering direction, main contacts 30m of an electromagnetic switch 30 complete a connection from the supply conductor 12 to the armature terminal 10b and the field terminal 11a. A circuit including the armature winding 10 extends to the power conductor 14 from the armature terminal 10a through all or a portion of a resistor 31 and through all, a portion, or none of the resistor 22, depending upon which one of main contacts 32m, 41m, and 42m of electromagnetic switches 31, 41, and 42 are closed. A circuit including the field winding 11 extends to the supply conductor 14 from the field terminal 11b through the brake winding 21w and all or a portion of the resistor 22 depending upon the open or closed condition of the contacts 27m, 28m, and 29m, the contacts 20m serving to complete the connection from the right-hand terminal of the resistor 22 to the conductor 14. Speed control during lowering is effected by selective operation of the switches 27, 28, 29, 32, 41 and 42.

Acceleration relays may be used to delay the closure of the switches 27, 28, and 29 during hoisting operations, and, as shown relays 43, 44, and 45 having normally closed contacts 43a, 44a, and 45a, respectively, are provided for this purpose. Although any suitable type of acceleration relay may be used, relays 43, 44, and 45 are preferably of the type described and claimed in Trofimov Patent No. 1,980,736, issued November 13, 1934.

In accordance with this invention, electromagnetic relays 46 and 47 constitute a speed control device or relay means 48 which controls the establishment as well as the disestablishment of the highest speed lowering connections. In the speed control relay means 48 as shown in Fig. 1, the relay 46 is an acceleration relay having an operating winding 46w, normally closed contacts 46a, and normally open contacts 46b. The relay 47 is an overspeed relay having an operating winding 47w, normally closed contacts 47a and normally open contacts 47b. The relay 46 is operative to delay the opening of the switch 41 and the closure of the switch 42 during acceleration in a manner known in the art, as hereinbefore mentioned. The relay 47, however, is operative in accordance with the present invention to reclose the switch 41 and to reopen the switch 42 in event the motor speed reaches a predetermined value as will be explained more fully hereinafter. It will be noted that, in accordance with the present invention, the windings 46w and 47w are connected in series with each other in the same energizing circuit so that a failure of the circuit or the winding 47w before operation of the relay 46, prevents operation of the relay 46 so that speed conditions that would require the protection afforded by relay 47 cannot arise. Failure of the circuit after operation of the relay 46 assures reversion of the system to a safe slow speed condition. Although the relay means 48 has been shown as comprising two relays 46 and 47 provided with separate magnetic circuits, it will become apparent that a single relay structure having two armatures and either one or two windings could be used if desired though such is not as desirable economically.

Each of the switches and relays has an operating winding identified by the reference character of the particular switch or relay followed by the sub-script $w$, and, with the exception of the windings 43w, 44w, and 45w, the switch or relay operating windings are under direct control of a multi-position, reversing master switch 54 having a plurality of contacts 54a to 54k, inclusive. Several of the switches are provided with control circuit contacts which are identified by the reference character of the particular switch followed by a letter sub-script such as $a$, $b$, or $c$. To simplify the drawing, many of the switch and relay contacts are shown in convenient physical locations in Fig. 1 for illustrating their switching function and are also shown in conjunction with their respective operating windings to illustrate how they are operated. All of the master switch contacts are open when the master switch 54 is in the off position illustrated, and are arranged to be closed selectively in the operated positions of the master switch as indicated by the small circles in the conductors leading to the contacts. For example, the contacts 54i are closed in the fifth hoisting position and in the first and second lowering positions and are open in all other positions. Each of the master switch contacts 54b to 54k when closed completes a circuit from the power supply conductor 12 through one or more switch operating windings to the supply conductor 14. The contacts 54a when closed complete a circuit from the supply conductor 12 through the operating windings 46w and 47w of the relay means 48 and a conductor 55 to the armature terminal 10a, the windings 46w and 47w being connected in series with each other in the same energizing circuit for a reason previously explained. To simplify the drawing, the usual undervoltage relay and overload relays have been omitted, but these may be added in the conventional manner if desired.

With the foregoing understanding of the control system elements and their electrical interconnection, the operation of the system will become apparent from the following description thereof:

Assuming that the motor is at standstill and the operating winding 21w of the brake 21 is de-energized so that the brake holds the armature winding 10 and the drum 16 against rotation, and further assuming that the remainder of the apparatus is in the normal de-energized positions indicated by the drawing, an emergency dynamic braking circuit is completed from the armature terminal 10a through the resistor 31, the contacts 32m, and the field winding 11 from the terminal 11b to the terminal 11a which is connected to the armature terminal 10b.

To hoist the hook 15 at slow speeds, the master switch 54 is moved to its first hoisting position causing the contacts 54b and 54c to close and complete circuits from the supply conductor 12 through the windings 20w and 19w, respectively, to the supply conductor 14, and causing the contacts 54k to close and partially complete a circuit from the conductor 12 through conductors 56 and 57 and the winding 32w to the conductor 14 which circuit is completed upon closure of contacts 19a consequent upon energization of the winding 19w. Energization of the windings 19w and 20w causes closure of the contacts 19m and 20m to complete a circuit extending from the conductor 12 through the contacts 19m, the armature winding 10, the field winding 11, the brake winding 21w, the resistor 22 and the contacts 20m to the conductor 14, and energization of the winding 32w causes opening of the normally-closed contacts 32m to remove the shunt connection around the motor through the resistor 31. Closure of the contacts 19b partially completes an energizing circuit for the winding 26w, and opening of the contacts 19c prevents energization of the winding 42w during hoisting. Closure of the contacts 32c and opening of the contacts 32a resulting from the energization of the winding 32w are of no effect during hoisting, but closure of the contacts 32b partially completes a circuit later to be completed from the conductor 12 to the winding 27w. In event that the switch 32 fails to operate for any reason upon energization of the winding 32w, the consequent failure of the contacts 32b to close renders subsequent energization of the winding 27w impossible thereby to prevent acceleration of the motor to its normal speed while hoisting.

Movement of the master switch 54 to the second hoisting position causes the contacts 54d to close and complete a circuit from the conductor 12 to the conductor 14 through the winding 26w and the contacts 19b which closed upon energization of the winding 19w.

Energization of the winding 26w causes closure of the contacts 26a in an energizing circuit for the winding 27w and causes closure of the contacts 26m which, when closed, short circuit the resistor sections 22a and 22b. The current flowing around the resistor sections 22a and 22b through the contacts 26m energizes the winding 43w and causes opening of the contacts 43a in the energizing circuit for the winding 27w for a time interval dependent upon the magnitude of the current flowing through the winding 43w during the interval as described in the Trofimov patent identified hereinbefore.

A further increase in hoisting speed is obtained by moving the master switch 54 to the third hoisting position causing the contacts 54e to close to partially complete the energizing circuit for the winding 27w which is completed when the contacts 43a reclose.

Energization of the winding 27w causes closure of the contacts 27m to short circuit the resistor section 22c and also causes closure of the contacts 27a in an energizing circuit for the winding 28w. Upon closure of the contacts 27m, the motor current flowing therethrough causes energization of the winding 44w of the relay 44 which thereupon opens the contacts 44a in the energizing circuit for the winding 28w for a time interval as in the case of the relay 43.

When the master switch is moved to the fourth hoisting position, the contacts 54g close and complete a circuit from the conductor 12 through the winding 28w to the conductor 14 provided that the contacts 44a have reclosed. Energization of the winding 28w causes closure of the contacts 28m to short circuit the resistor section 22d and also causes closure of contacts 28a in an energizing circuit for the winding 29w. The relay 45 responds upon closure of the contacts 28m to open its contacts 45a for a time interval.

If the master switch is now moved to the fifth hoisting position, the contacts 54i close and complete an energizing circuit for the winding 29w depending upon the prior closure of the contacts 45a and 28a. Closure of the contacts 29m upon energization of the winding 29w short circuits the remainder of the resistor 22 so that the motor is now connected directly across the power supply conductors 12 and 14.

Return of the master switch 54 to its off position de-energizes all of the switch windings. The motor is now disconnected from the supply conductors 12 and 14 and the brake 21 is set.

Power lowering or dynamic braking lowering of the hook 15 is accomplished by moving the master switch 54 to any one of the lowering positions. Upon movement of the master switch to the first lowering position, the windings 20w, 27w, 29w, and 30w of the switches 20, 27, 29 and 30, respectively, are energized concurrently, and the winding 28w is energized as soon as the contacts 27a close. The energizing circuit for the winding 20w is completed from the supply conductor 12 through the contacts 54b, and the energizing circuit for the winding 27w is completed through the contacts 54f. The energizing circuit for the winding 30w is completed through the contacts 54j, the energizing circuit for the winding 28w is completed through the contacts 54h after the contacts 27a close, and the circuit to the winding 29w is initially completed through the contacts 54j and the normally closed interlock contacts 32a interposed in a conductor 58 thereby insuring closure of the switch 29 concurrently with closure of the switches 20, 27, and 30. After closure of the switch 28, due to energization of its winding 28w, a circuit through the contacts 54i and the contacts 28a is completed and becomes operative upon subsequent opening of the contacts 32a to continue the energization of the winding 29w.

Energization of the windings 20w, 27w, 28w, 29w, and 30w results in closure of the contacts 20m, 27m, 28m, 29m, and 30m to connect the motor in a slow-speed dynamic lowering circuit. With the lowering contacts 30m closed, a circuit is completed from the supply conductor 12 through the contacts 30m to the armature terminal 10b where the circuit divides into parallel connected armature and field circuits. The armature circuit with the master switch in the first lowering position is from the armature terminal 10b through the armature winding 10 to the armature terminal 10a, and thence through all of the resistor 31 and the contacts 32m to the field terminal 11b, and the corresponding field circuit extends from the armature terminal 10b through the field winding 11 from the field terminal 11a to the field terminal 11b. The first point lowering line circuit is completed from the field terminal 11b through the brake winding 21w, the contacts 29m, the winding 43w (the relay 43 is ineffective during lowering, however), the resistor sections 22b and 22a, and the contacts 20m to the supply conductor 14. With the foregoing motor circuit completed, a very slow lowering speed is obtained for all loads.

An increased lowering speed for light as well as heavy loads is obtained upon movement of the master switch 54 to the second lowering position. Upon closure of the master switch contacts 54k in the second lowering position, an energizing circuit for the winding 41w is completed through the contacts 30a, which closed upon energization of the winding 30w, a conductor 60, and the contacts 42a and 46a in parallel with each other. The contacts 41b close upon energization of the winding 41w to complete a circuit from the conductor 60, the contacts 41b, and the conductors 56 and 57 to the winding 32w.

This sequential energization of the windings 41w and 32w results in closure of the contacts 41m followed by opening of the contacts 32m thus insuring that the armature circuit is not opened. The armature circuit now extends through sections 31c and 31b of the resistor 31 and the contacts 41m to a junction point 22' on the resistor 22 between the sections 22a and 22b, and the field circuit now extends through the brake winding 21w, the contacts 29m, the winding 43w, and the resistor section 22b to the junction point 22' from whence the line circuit is completed to the supply conductor 14 through the resistor section 22a and the contacts 20m. Energization of the winding 41w also results in opening of the contacts 41a to prevent premature energization of the winding 42w. Energization of the winding 32w also results in closure of the contacts 32c in the energizing circuit for the windings 46w and 47w, in closure of the contacts 32b which serve no function during lowering, and opening of the contacts 32a to interrupt the circuit to the winding 29w through the contacts 54j. The contacts 32c prevent premature energization of the circuit including the windings 46w and 47w when the master switch is moved rapidly to the last lowering position while the motor is operating in the hoisting direction.

A further increase in the lowering speed is obtained by moving the master switch 54 to the third lowering position which causes the contacts 54h and 54i to open resulting in deenergization of the windings 28w and 29w, the contacts 32a having opened upon operation of the switch 32. Opening of the contacts 28m and 29m consequent upon deenergization of the windings 28w and 29w inserts the resistor sections 22d and 22e into the field circuit which now extends from the armature terminal 10b through the field winding 11, the brake winding 21w, the resistor sections 22e and 22d, the winding 44w (the relay 44 is ineffective in lowering, however), the contacts 27m, the winding 43w and the resistor section 22b to the junction point 22'.

Movement of the master switch 54 to the fourth lowering position results in a further increase in the lowering speed due to the opening of the contacts 27m consequent upon deenergization of the winding 27w resulting from opening of the contacts 54f. The field circuit now includes the resistor sections 22b, 22c, 22d, and 22e. It should be noted that the resistance of both the armature and line circuits remains the same in the second, third, and fourth lowering positions. Preferably, the resistance of the resistor section 22a in the line circuit is of such value that the stability limit of the motor is not approached even in the fourth lowering speed point irrespective of any conceivable load that might be placed on the hook 15.

In accordance with this invention, movement of the master switch 54 to the fifth lowering position causes closure of the contacts 54a to connect the windings 46w and 47w of the relay means 48 in series with each other across the armature winding, 10. The circuit for the windings 46w and 47w is from the armature terminal 10b, the contacts 30m, the supply conductor 12, the contacts 54a and 32c, the windings 46w and 47w, and the conductor 55 to the armature terminal 10a. As mentioned hereinbefore, the contacts 32c are included in this circuit only to prevent premature operation of the relay 46 if the master switch is moved rapidly to the fifth lowering position while the motor is operating in the hoisting direction. The relay 46 is so adjusted that as soon as the counter-voltage of the armature 10 reaches a predetermined value after closure of the contacts 54a, or if the counter-voltage is in excess of that value when the contacts 54a close, the winding 46w is energized sufficiently to open the contacts 46a and to close the contacts 46b. Preferably, the relay 46 is adjusted to pick-up when the counter-voltage reaches, or is in excess of, about forty-five percent of the voltage between the supply lines 12 and 14.

The increase in the counter-voltage of the armature winding 10 as the motor accelerates in the lowering direction with the fourth speed point connections established is indicated by a curve 65 in Fig. 3 wherein voltage across the armature winding 10 and torque at the motor shaft 17 are plotted against lowering speed. A point 65' on the curve 65 indicates a counter-voltage of forty-five percent of rated voltage and a motor speed of about seventy-five percent of full load speed. The motor, with fourth point lowering connections established, operates as indicated by a speed-torque curve 68. It should be noted that the curve 68 shows the motor torque as increasing uniformly with speed throughout the overhauling quadrant with no possibility of the lowering speed becoming excessive.

Opening of the contacts 46a upon operation of the relay 46 interrupts one circuit for the winding 41w, and closure of the contacts 46b completes an energizing circuit for the winding 42w from the conductor 60 through the contacts 47a. Energization of the winding 42w results in closure of the contacts 42m and 42b and opening of the contacts 42a. Opening of the contacts 42a opens the only remaining energizing circuit for the winding 41w and the switch 41 drops out to open the contacts 41m and 41b and to close the contacts 41a. Opening of the contacts 41b interrupts one circuit for the winding 32w, but the winding 32w remains energized through the contacts 42b and 19c.

Sequential closing of the contacts 42m and opening of the contacts 41m consequent upon sequential energization of the winding 42w and deenergization of the winding 41w causes the field circuit now to include all of the resistor 22 and the armature circuit to include only the resistor section 31c. As illustrated, no resistor section is now included in the line circuit, its only resistance being that inherent in the conductors and contacts thereof, but, if desired, a resistor of small ohmic value may be left in the line circuit. The motor now operates as indicated by a speed-torque curve 69 of Fig. 3 and the counter-voltage increases as indicated by a curve 70. The speed-torque curve 69 is indicative of motor operation such that even relatively large overloads on the hook 15 are insufficient to cause an excessive lowering speed and the speed stabilizes at a safe value. Should the load on the hook be a very large overload, however, or for some reason cause an excessive torque at the motor shaft, the increased current generated by the armature 10 causes a decrease in the active motor flux and the retarding torque exerted on the load by the motor does not increase uniformly with speed and the motor becomes unstable. However, when the speed reaches a value near the limit of stability, the counter-voltage has increased to the value indicated at 70' on the curve 70. The relay 47 is adjusted to pick up at this value of voltage and the contacts 47a open and the contacts 47b close. Closure of the contacts 47b completes a circuit for the winding 41w from the conductor 60 and the switch 41 recloses the contacts 41m and 41b and opens the contacts 41a. Since the contacts 47a are now open, opening of the contacts 41a causes deenergization of the winding 42w and the switch 42 opens its contacts 42m. It should be noted that the contacts 41m must close before the contacts 42m open, and that therefore the armature circuit is not interrupted. Closure of the contacts 41b before the contacts 42b open insures that the energization of the winding 32w is maintained. The fourth point connections are now reestablished and the motor operates as indicated by the curve 68 and decelerates to a stable safe speed. The armature voltage is now in excess of the drop-out voltage of both relays 46 and 47 and the fifth point lowering connections cannot be reestablished unless the motor is first stopped or caused to operate at a reduced speed.

From the foregoing it is clear that even if the master switch 54 is in the fifth lowering speed point, the fastest lowering connections cannot be established unless and until the acceleration relay 46 operates to open its contacts 46a and to close its contacts 46b. Should the overspeed relay 47 be inoperative by reason of an open circuit in its operating winding 47w or in the energizing circuit therefor, the relay 46 does not operate and the fastest lowering speed connections cannot be established. Since the operation of the relay 47 is only required while the fastest lowering speed connections are established, a failure of the energizing circuit for the relay 47 prevents those connections from being established. Thus not only is an indication of the inoperativeness of the overspeed relay 47 given before it is called upon to operate, but also the invention, in event the overspeed relay is inoperative, prevents conditions from arising which would require it to operate. This "fail safe" protection is also provided should the relay 47 become inoperative after the relay 46 operates. This is because, after the relay 46 has operated, a failure of the energizing circuit for the relay 47 causes opening of the relay 46 with consequent reestablishment of the safe fourth point lowering connections just as if the relay 47 had operated or the master switch had been returned to the fourth lowering speed point.

Movement of the master switch from the higher to the slower lowering speed positions or to the off position results in sequential operation of the switches opposite from that described for lowering acceleration. Even if the relay 47 does not operate, the armature circuit is not opened during lowering deceleration since the winding 41w is energized through the contacts 46a upon drop-out of the relay 46 and the winding 42w remains energized after opening of the contacts 46b through a circuit including the contacts 41a and 42b until the contacts 41a open. Although the windings 41w and 32w are deenergized concurrently in moving the master switch from the second to the first lowering position, the contacts 32m due to their spring bias close before the contacts 41m open.

For the operation illustrated in Fig. 3, the resistance values of the respective motor circuits during last point lowering are so selected that only an overload on the hook 15 causes pick-up of the relay 47 and resulting automatic transfer from fifth to fourth point connections. It is obvious, however, that the fifth point resistance values could be so selected that a much higher light load lowering speed could be obtained with a consequent decerease in the torque at the stability limit. In such case the relay 47 would be so adjusted that overhauling loads under rated load would cause transfer from fifth to fourth point connections. This operation is illustrated in Fig. 4 wherein a curve 75 is the speed-torque characteristic of the motor with fourth point connections established, the voltage across the armature winding 10 varying as shown by a curve 76. With the master switch in the fifth lowering position the contacts 54a are closed, and the relay 46 picks up if, or as soon as, the voltage across the armature winding 10 reaches a value indicated at 76'. Fifth point connections are thereupon established as described hereinbefore. Assuming that the resistance of the resistor 22 has been increased from the value which caused operation of the motor as indicated by the curve 69 of Fig. 3, operation of the motor is now as indicated by a speed-torque curve 79 of Fig. 4. The curve 79 shows that the light load lowering speed of the motor is much higher and the stability limit is lower than before. The change in armature voltage with speed is now as indicated by a curve 80 and the relay 47 is now adjusted to pick-up at an armature voltage value indicated at 80' to retransfer to fourth point lowering connections before the stability limit is reached and before the retarding torque of the motor has increased to a very high value.

Preferably the relays 46 and 47 are so selected that the operating windings 46w and 47w can be identical thereby to equalize the heating of the windings, the higher pick-up voltage value of the relay 47 being obtained by spring selection and adjustment. As mentioned hereinbefore, the speed control relay means 48 may comprise a single relay having a common magnetic circuit except for the cores of the two windings and the two armatures associated with the respective sets of contacts 46a and 46b and 47a and 47b. It will also be apparent to those skilled in the art that the relay means 48 could comprise only a single relay having a single winding and two separate armatures adjusted to pick up at different values of excitation. This latter construction is illustrated in Fig. 2 wherein parts similar to and connected like those of Fig. 1 are indicated by the same reference numeral plus one hundred.

Referring to Fig. 2, an acceleration and overspeed relay means 90 comprises an operating winding 90w associated with an elongated pole piece 91 which is arranged to attract a pair of armatures 92 and 93 normally biased to the position shown by adjustable springs 92s and 93s, respectively. The armature 92 actuates normally-closed contacts 147a and normally-open contacts 147b and the armature 93 actuates normally-closed contacts 146a and normally-open contacts 146b. When master switch contacts 154a and interlocking switch contacts 132c are closed, the winding 90w is connected across the armature winding of the hoist motor through a conductor 155. The spring 93s is so adjusted that, when the armature voltage increases to a relatively low predetermined value, the armature 93 is attracted to close the contacts 146b and to open the contacts 146a. Closure of the contacts 146b causes energization of the winding 142w and opening of the contacts 146a causes deenergization of winding 141w after opening of the contacts 142a thereby to establish faster lowering connections. The spring 92s is so adjusted that should the voltage impressed on the winding 90w now increase to a value indicative of an excessive speed, the armature 92 is attracted to open the contacts 147a and to close the contacts 147b. Closure of the contacts 147b causes a re-energization of the winding 141w and opening of the contacts 147a causes deenergization of the winding 142w after the contacts 141a open thereby resulting in reestablishment of slower and safer speed connections.

Thus in both Fig. 1 and Fig. 2 the operating means for the speed controlling relay means can be said to be connected in a single circuit. "Connected in a single circuit" may be said to mean so connected in a circuit that the failure of one portion of the operating means, even where it comprises two separate windings, renders the other portion of the operating means inoperative, thus (as in both Figs. 1 and 2), insuring that if either the means for controlling acceleration or deceleration fails, the operating means as a whole becomes inoperative.

Having thus described our invention, we claim:

1. A control system for lowering a load by a direct current motor adapted for connection to a source of power and having a field winding of the series type and an armature winding, said system comprising a field circuit resistor, a line circuit resistor, lowering switching means operable to connect the field winding in series with both said field circuit resistor and said line circuit resistor across the source of power and to connect the armature winding in parallel with the series connected field winding and field circuit resistor and in series with said line circuit resistor, high speed switching means operable to increase the resistance of said field circuit resistor and to decrease the resistance of said line circuit resistor, an electroresponsive acceleration control means operative upon the voltage across said armature winding reaching a predetermined low value after operation of said lowering switching means for effecting operation of said high speed switching means, an electroresponsive overspeed control means operative upon the voltage across said armature winding reaching a predetermined higher value after operation of said high speed switching means for rendering said high speed switching means inoperative, and interlocking means for said acceleration control means and said overspeed control means preventing operation of said acceleration control means if said overspeed control means is inoperative.

2. A control system in accordance with claim 1 characterized in that said acceleration control means and said overspeed control means have respective operating windings connected in series in a common energizing circuit.

3. A control system in accordance with claim 1 characterized in that said acceleration control means and said overspeed control means have a common operating winding connected in a single energizing circuit.

4. A control system for lowering a load by a direct current motor adapted for connection to a source of power and having a field winding of the series type and an armature winding, said system comprising a field circuit resistor, a line circuit resistor, lowering switching means operable to connect the field winding in series with both said field circuit resistor and said line circuit resistor across the source of power and to connect the armature winding in parallel with the series connected field winding and field circuit resistor and in series with said line circuit resistor, low speed switching means operable for increasing the resistance of said field circuit resistor, high speed switching means operable to further increase the resistance of said field circuit resistor and to decrease the resistance of said line circuit resistor, an electroresponsive acceleration control means operative upon the voltage across said armature winding reaching a predetermined low value after operation of said lowering switching means and said low speed switching means for effecting operation of said high speed switching means and for rendering said low speed switching means inoperative, an electroresponsive overspeed control means operative upon the voltage across said armature winding reaching a predetermined higher value after operation of said high speed switching means for rendering said low speed switching means operative and for rendering said high speed switching means inoperative, and interlocking means for said acceleration control means and said overspeed control means preventing operation of said acceleration control means if said overspeed control means is inoperative.

5. A control system in accordance with claim 4 characterized in that additional interlocking means prevents said low speed switching means from becoming inoperative until said high speed switching means is operated and prevents said high speed switching means from becoming inoperative until said low speed switching means is again operated.

6. A hoist control system of the type wherein the armature winding of a direct current hoist motor is connected in parallel with a series circuit which includes the series field winding of the hoist motor and also a relatively large resistance and wherein the parallel circuit including the armature and field windings is connected, for slow speed lowering operation, across the supply source in series with a line circuit of relatively high resistance and wherein an electromagnetic relay means interposed in a control circuit connected across said armature winding operates to reduce the resistance of said line circuit upon a predetermined slow speed being reached, characterized in that said relay means includes means which, when the lowering speed reaches a predetermined higher speed becomes responsive to current in said control circuit for increasing the resistance of said line circuit.

7. A control system for lowering a load by a direct current motor adapted for connection to a source of power and having a field winding of the series type and an armature winding, said system comprising field circuit resistance means, line circuit resistance means, lowering switching means operable to connect the field winding in series with both said field circuit resistance means and said line circuit resistance means across the source of power and to connect the armature winding in parallel wtih the series connected field winding and said field circuit resistance means and in series with said line circuit resistance means, means for effecting operation of said lowering switching means, high speed switching means operable to change the effective resistance of at least one of said resistance means, an electromagnetic relay means having an operating means, means for connecting said operating means for energization in a single circuit across said armature winding while said lowering switching means is operated, said relay means including acceleration control means operative upon the voltage across said armature winding reaching a predetermined low value after operation of said lowering switching means for effecting operation of said high speed switching means, and said relay means including deceleration control means operative upon the voltage across said armature winding reaching a predetermined higher value after operation of said high speed switching means for rendering said high speed switching means inoperative.

8. The control system of claim 7 characterized in that the relay means is so adjusted that the reduction of voltage across said armature winding that occurs upon said high speed switching means becoming inoperative is insufficient to cause said deceleration control means to become inoperative.

9. The control system of claim 7 characterized in that said acceleration control means comprises a first armature responsive to said operating means and said deceleration control means comprises a second armature responsive to said operating means.

10. A hoist control system in accordance with claim 6 characterized in that the resistance of said line circuit after said reduction, is insufficient to maintain the stability limit of said motor beyond a relatively low retarding torque, and that said predetermined higher speed is less than the speed at which said relatively low retarding torque is reached.

11. A control system and motor combination for hoisting and lowering a load comprising a direct current motor adapted for connection to a source of power and having a field winding of the series type and an armature winding, hoisting switching means operable to connect said field winding and said armature winding in series across a source of power for hoisting a load, a field circuit resistance means, a line circuit resistance means, lowering switching means operable to connect the field winding in series with said field circuit resistance means and said line circuit resistance means across the source of power and to connect the armature winding in parallel with the series connected field winding and field circuit resistance means and in series with said line circuit resistance means, fast speed switching means operable to change the value of at least one of said resistance means so that the current in said field winding is at a relatively low value and normally so remains with increasing lowering speed, slow speed switching means operable to change the value of at least one of said resistance means so that the current in said field winding increases materially with increasing lowering speed, an electroresponsive acceleration control means normally preventing operation of said fast speed switching means and operative upon the lowering speed of said motor reaching a predetermined low value after operation of said lowering switching means for permitting operation of said fast speed switching means, an electroresponsive overspeed control means operative upon the voltage across said armature winding reaching a predetermined higher value after operation of said fast speed switching means for rendering said slow speed switching means operative and said fast speed switching means inoperative, and electrical interlocking means for said acceleration control means and said overspeed control means operative to prevent operation of said acceleration control means if said overspeed control means is inoperative.

12. A control system for controlling the lowering of an overhauling load by a direct current motor having a field winding of the series type and an armature winding and having one terminal of the field winding connected to one terminal of the armature winding, said system comprising a resistor, slow speed switching means operable to connect the other terminals of the field winding and the armature winding to each other through a portion of said resistor to provide a dynamic lowering circuit for slow speed lowering, high speed switching means operable to increase the amount of said resistor connected in said lowering circuit thereby to render said lowering circuit a high speed dynamic lowering circuit, an electromagnetic relay means having an operating means, a single circuit, means connecting said operating means in and for operation solely by said single circuit, means operable to connect said single circuit in parallel with said armature winding, while said lowering circuit is completed, for rendering said operating means responsive to the voltage across said armature winding, means responsive to a predetermined low value of energization of said operating means for operating said high speed switching means, and means responsive to a predetermined higher value of energization of said operating means for rendering said high speed switching means inoperative and said low speed switching means operative.

JOHN D. LEITCH.
WARD L. SMITH.

REFERENCES CITED

The following references are of record in the file of this patent:

UNITED STATES PATENTS

| Number | Name | Date |
|---|---|---|
| 1,819,465 | James | Aug. 18, 1931 |
| 2,342,961 | Newman | Feb. 29, 1944 |
| 2,351,796 | Wright | June 20, 1944 |